United States Patent
Ohara et al.

(10) Patent No.: US 11,703,326 B2
(45) Date of Patent: Jul. 18, 2023

(54) STEREO CAMERA APPARATUS, VEHICLE, AND PARALLAX CALCULATION METHOD

(71) Applicant: KYOCERA Corporation, Kyoto (JP)

(72) Inventors: Naoto Ohara, Yokohama (JP); Kenji Kono, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/079,320

(22) PCT Filed: Feb. 17, 2017

(86) PCT No.: PCT/JP2017/005969
§ 371 (c)(1),
(2) Date: Aug. 23, 2018

(87) PCT Pub. No.: WO2017/145945
PCT Pub. Date: Aug. 31, 2017

(65) Prior Publication Data
US 2019/0017819 A1  Jan. 17, 2019

(30) Foreign Application Priority Data

Feb. 25, 2016 (JP) .................................. 2016-034904

(51) Int. Cl.
*G01C 3/08* (2006.01)
*G08G 1/16* (2006.01)
(Continued)

(52) U.S. Cl.
CPC ............... *G01C 3/085* (2013.01); *G01C 3/14* (2013.01); *G06T 5/006* (2013.01); *G06T 7/248* (2017.01);
(Continued)

(58) Field of Classification Search
CPC .......... G01C 3/085; G01C 3/14; G06T 5/006; G06T 7/248; G06T 7/593;
(Continued)

(56) References Cited

U.S. PATENT DOCUMENTS 4,999,713 A * 3/1991 Ueno ..................... G03B 35/08
348/240.3
5,978,015 A * 11/1999 Ishibashi ................ G03B 35/08
348/47
(Continued)

FOREIGN PATENT DOCUMENTS

JP     H10-129375 A       5/1998
JP    H10129375 A *      5/1998
(Continued)

*Primary Examiner* — Christopher S Kelley
*Assistant Examiner* — Asmamaw G Tarko
(74) *Attorney, Agent, or Firm* — Studebaker & Brackett PC

(57) ABSTRACT

A stereo camera apparatus includes a first imaging unit including a first imaging optical system provided with a plurality of lens groups, and a first actuator configured to change a focal length by driving at least one of the plurality of lens groups of the first imaging optical system; a second imaging unit including a second imaging optical system provided with a plurality of lens groups, and a second actuator configured to change a focal length by driving at least one of the plurality of lens groups of the second imaging optical system; a focal length controller configured to output synchronized driving signals to the first and second actuators; and an image processing unit configured to calculate a distance to a subject by using images captured by the first imaging unit and the second imaging unit.

9 Claims, 6 Drawing Sheets

(51) Int. Cl.

| | |
|---|---|
| *G01C 3/14* | (2006.01) |
| *H04N 23/69* | (2023.01) |
| *H04N 23/81* | (2023.01) |
| *G06T 7/246* | (2017.01) |
| *G06T 7/593* | (2017.01) |
| *H04N 13/296* | (2018.01) |
| *H04N 13/239* | (2018.01) |
| *G06T 5/00* | (2006.01) |
| *H04N 13/00* | (2018.01) |
| *H04N 23/55* | (2023.01) |
| *H04N 23/67* | (2023.01) |
| *B60R 1/12* | (2006.01) |
| *G06T 5/50* | (2006.01) |

(52) U.S. Cl.
CPC ............... *G06T 7/593* (2017.01); *G08G 1/16* (2013.01); *H04N 13/239* (2018.05); *H04N 13/296* (2018.05); *H04N 23/69* (2023.01); *H04N 23/81* (2023.01); *B60R 1/12* (2013.01); *B60R 2001/1253* (2013.01); *G06T 5/50* (2013.01); *G06T 2207/10012* (2013.01); *G06T 2207/10028* (2013.01); *G06T 2207/30252* (2013.01); *G06T 2207/30256* (2013.01); *G06T 2207/30261* (2013.01); *H04N 23/55* (2023.01); *H04N 23/67* (2023.01); *H04N 2013/0081* (2013.01)

(58) Field of Classification Search
CPC . G06T 2207/10012; G06T 2207/10028; G06T 2207/30252; G06T 2207/30256; G06T 2207/30261; G06T 5/50; H04N 13/239; H04N 13/296; H04N 5/23296; H04N 2013/0081; H04N 5/217; H04N 5/2254; H04N 5/23212; B60R 1/12; B60R 2001/1253; C07K 14/415; C12N 15/8247; G08G 1/16

USPC .................................. 348/47; 800/281, 320.1
See application file for complete search history.

(56) References Cited

U.S. PATENT DOCUMENTS

| | | | |
|---|---|---|---|
| 7,747,150 | B2 | 6/2010 | Anai et al. |
| 2007/0236561 | A1 | 10/2007 | Anai et al. |
| 2010/0238272 | A1* | 9/2010 | Cameron ............. H04N 13/363 348/47 |
| 2012/0046855 | A1* | 2/2012 | Wey .................... G06K 9/00791 701/117 |
| 2012/0236125 | A1* | 9/2012 | Umezawa ................ G01C 3/14 348/47 |
| 2015/0288943 | A1* | 10/2015 | Kuranuki ................ G06T 7/593 348/47 |
| 2016/0146602 | A1* | 5/2016 | Ishimaru ................ G06T 7/593 348/47 |
| 2016/0318523 | A1* | 11/2016 | Kim ......................... B60R 1/00 |
| 2017/0243483 | A1* | 8/2017 | Kaneshige ........... G06K 9/6281 |
| 2017/0267178 | A1* | 9/2017 | Shiga ................ H01L 27/14645 |
| 2018/0209795 | A1* | 7/2018 | Okuyama ............. G01C 21/30 |
| 2019/0016339 | A1* | 1/2019 | Ishioka ................ G05D 1/0223 |
| 2019/0017819 | A1* | 1/2019 | Ohara ................ H04N 5/23296 |

FOREIGN PATENT DOCUMENTS

| | | | | |
|---|---|---|---|---|
| JP | H11-312300 | A | | 11/1999 |
| JP | 2000-121319 | A | | 4/2000 |
| JP | 2001-221621 | A | | 8/2001 |
| JP | 2001221621 | A | * | 8/2001 |
| JP | 2004-053323 | A | | 2/2004 |
| JP | 2005-274518 | A | | 10/2005 |
| JP | 2007-241304 | A | | 9/2007 |
| JP | 2007-278845 | A | | 10/2007 |
| JP | 2013-044827 | A | | 3/2013 |
| JP | 2013044827 | A | * | 3/2013 |
| JP | 2013-206416 | A | | 10/2013 |
| JP | 2013206416 | A | * | 10/2013 |

\* cited by examiner

STEREO CAMERA APPARATUS, VEHICLE, AND PARALLAX CALCULATION METHOD

CROSS REFERENCE TO RELATED APPLICATION

This application claims priority to and the benefit of Japanese Patent Application No. 2016-34904 filed on Feb. 25, 2016, the entire contents of which are incorporated herein by reference.

TECHNICAL FIELD

The present disclosure relates to a stereo camera apparatus, a vehicle, and a parallax calculation method.

BACKGROUND

Recently, vehicles include several cameras mounted therein for the purpose of assisting a driver in viewing areas less visible for the driver, detecting obstacles, recording surrounding environment during driving, etc. In particular, cameras for detecting obstacles in front of a vehicle have been developed and increasingly commercialized to be used for an anti-collision system against a vehicle traveling in front and obstacles on the road.

SUMMARY

A stereo camera apparatus according to one of a plurality of embodiments of the present disclosure includes a first imaging unit, a second imaging unit, a focal length controller, and an image processing unit. The first imaging unit includes a first imaging optical system provided with a plurality of lens groups, and a first driving unit configured to change a focal length by driving at least one of the plurality of lens groups of the first imaging optical system. The second imaging unit includes a second imaging optical system provided with a plurality of lens groups, and a second driving unit configured to change a focal length by driving at least one of the plurality of lens groups of the second imaging optical system. The focal length controller outputs synchronized driving signals to the first driving unit and the second driving unit. The image processing unit calculates a parallax with respect to a subject by using images captured by the first imaging unit and the second imaging unit.

A vehicle according to one of a plurality of embodiments of the present disclosure includes a stereo camera apparatus. The stereo camera apparatus includes a first imaging unit, a second imaging unit, a focal length controller, and an image processing unit. The first imaging unit includes a first imaging optical system provided with a plurality of lens groups, and a first driving unit configured to change a focal length by driving at least one of the plurality of lens groups of the first imaging optical system. The second imaging unit includes a second imaging optical system provided with a plurality of lens groups, and a second driving unit configured to change a focal length by driving at least one of the plurality of lens groups of the second imaging optical system. The focal length controller outputs synchronized driving signals to the first driving unit and the second driving unit. The image processing unit calculates a parallax with respect to a subject by using images captured by the first imaging unit and the second imaging unit.

A parallax calculation method according to one of a plurality of embodiments of the present disclosure uses a stereo camera apparatus including a first imaging unit and a second imaging unit. The first imaging unit includes a first imaging optical system provided with a plurality of lens groups, and a first driving unit configured to change a focal length by driving at least one of the plurality of lens groups of the first imaging optical system. The second imaging unit includes a second imaging optical system provided with a plurality of lens groups, and a second driving unit configured to change a focal length by driving at least one of the plurality of lens groups of the second imaging optical system. The parallax calculation method includes outputting synchronized driving signals to the first driving unit and the second driving unit and changing the focal length of the first imaging optical system and the focal length of the second imaging optical system. The parallax calculation method further includes calculating a parallax with respect to a subject by using images captured by the first imaging unit and the second imaging unit.

BRIEF DESCRIPTION OF THE DRAWINGS

In the accompanying drawings:

FIG. 7A illustrates road markings of a flat road; FIG. 7B illustrates road markings of a road changing from flat to uphill; and FIG. 7C illustrates road markings of a road changing from flat to downhill.

DETAILED DESCRIPTION

To measure a distance to an obstacle located in front by using a camera, a stereo camera apparatus configured to calculate a parallax with respect to the same object by using two or more cameras disposed substantially parallel to one another is used. In the stereo camera apparatus, in a manner similar to a monocular camera, a magnification and an angle of an area to be captured may be changed in accordance with a travel speed and/or a terrain of a road.

The stereo camera apparatus calculates a distance by comparing images captured by a plurality of cameras to a degree as small as sub-pixels. Thus, the plurality of cameras need to be highly accurately set to match one another. When the stereo camera apparatus has a zoom function, a distance may not be accurately measured without accurate synchronization of focal length control for the plurality of cameras.

A stereo camera apparatus, a vehicle, and a parallax calculation method according to embodiments of the present disclosure described below may simultaneously achieve the zoom function and highly accurate measurement of a distance.

Hereinafter, the embodiments of the present disclosure will be described with reference to the drawings. Note that the drawings used herein are schematically illustrated. The dimensions, ratios, and the like of the drawings may not necessarily be drawn to scale.

First Embodiment

Figure 1:
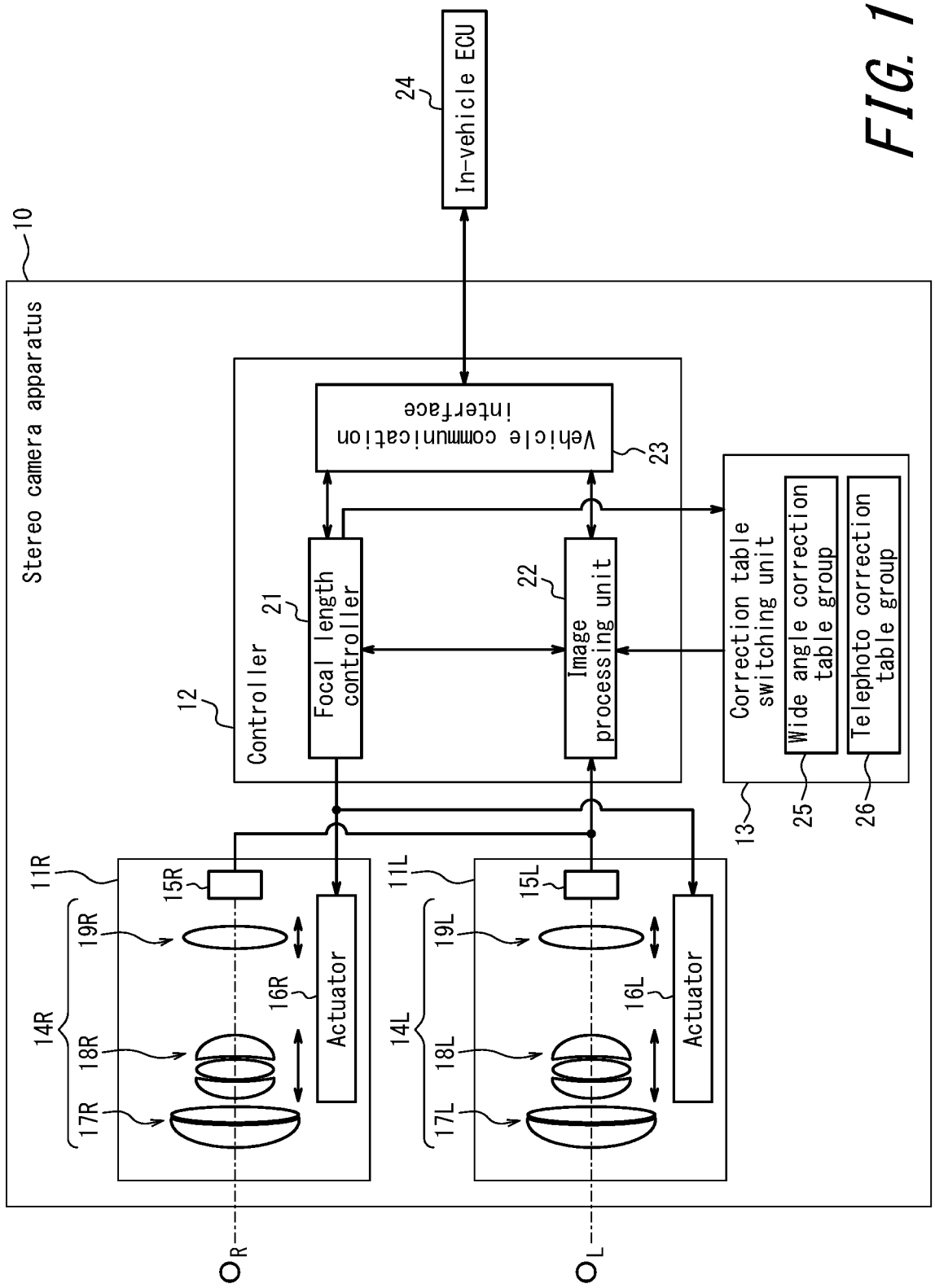
FIG. 1 is a diagram schematically illustrating a configuration of a stereo camera apparatus according to a first embodiment.

As illustrated in FIG. 1, a stereo camera apparatus 10 according to a first embodiment includes a first imaging unit 11R, a second imaging unit 11L, a controller 12, and a correction table switching unit 13. The "stereo camera apparatus" described herein is an apparatus provided with a plurality of cameras which have a parallax therebetween and cooperate with one another. The stereo camera apparatus includes at least two cameras. The stereo camera apparatus is capable of capturing a subject from a plurality of directions by making a plurality of cameras cooperate with one another. The stereo camera apparatus may be capable of simultaneously capturing a subject by making a plurality of cameras cooperate with one another. Here, the "simultaneous" capturing is not limited to capturing at the same time. The "simultaneous" capturing according to the present disclosure includes, for example, (i) capturing by a plurality of cameras at the same time, (ii) capturing by a plurality of cameras on the basis of the same signal, and (iii) capturing by a plurality of cameras at the same time on the basis of respective internal clocks. A reference capturing time includes a capturing start time, a capturing end time, a transmission time of data of a captured image, and a time at which data of an image is received by a destination apparatus. The stereo camera apparatus may include a housing accommodating a plurality of cameras. The stereo camera apparatus may include two or more cameras independent of, and remote from, one another. The stereo camera apparatus is not limited to include a plurality of cameras independent of one another. For example, according to the present disclosure, the stereo camera may be a camera including an optical system for guiding incident light at two separate positions to one light receiving element. In the stereo camera apparatus 10, the first imaging unit 11R and the second imaging unit 11L are independent of each other and arranged side by side. The stereo camera apparatus may record depth direction information by capturing a subject from a plurality of viewpoints with a parallax therebetween.

The stereo camera apparatus 10 according to the present embodiment is mounted in, for example, a vehicle such as an automobile. The term "vehicle" used herein encompasses, but is not limited to, automobiles, railway vehicles, industrial vehicles, and vehicles for daily life. The term vehicle may encompass, for example, aircrafts that travel on a runway. Automobiles may include any vehicle for traveling on the road such as, but not limited to, cars, trucks, buses, motorcycles, and trolleybuses. Railway vehicles may include vehicles for traveling along a track, such as, but not limited to, locomotives, freight cars, passenger coaches, trams, guide track railways, aerial trams, cable cars, linear motor trains, and monorails. Industrial vehicles include agricultural vehicles and construction vehicles. Industrial vehicles include, but are not limited to, forklifts and golf carts. Agricultural vehicles include, but are not limited to, tractors, tillers, transplanters, binders, combine harvesters, and lawn mowers. Construction vehicles include, but are not limited to, bulldozers, scrapers, excavators, crane trucks, dump trucks, and road rollers. Vehicles for daily life include, but are not limited to, bicycles, wheelchairs, strollers, wheelbarrows, and electric stand-on two-wheeled vehicles. Power units for the vehicle include, but are not limited to, internal combustion engines such as diesel engines, gasoline engines, and hydrogen engines, and electrical engines equipped with motors. The vehicles include vehicles that travel under human power. The classification of the vehicle is not limited to the above. For example, automobile may include industrial vehicles that can travel on the road, and a plurality of classifications may include the same vehicles.

Figure 2:
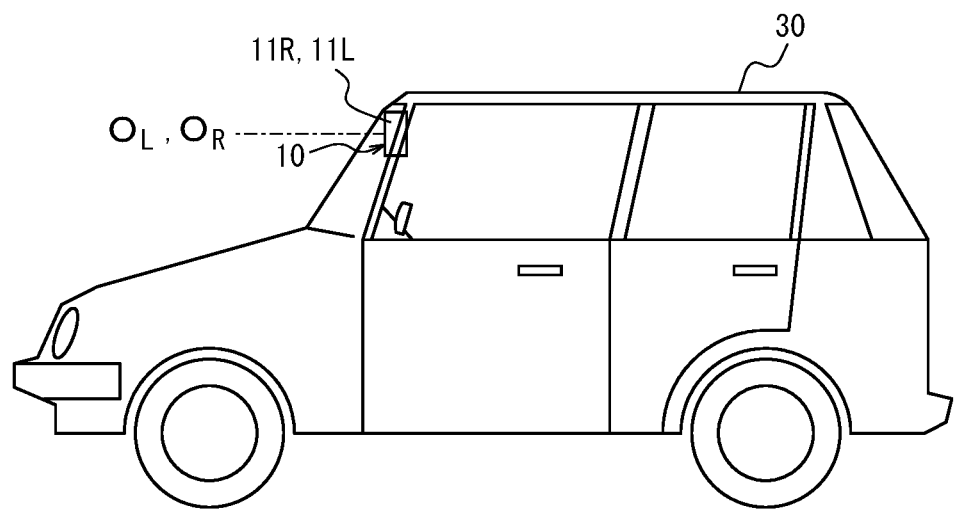
FIG. 2 is a side view schematically illustrating a vehicle having the stereo camera of FIG. 1 mounted therein.
Figure 3:
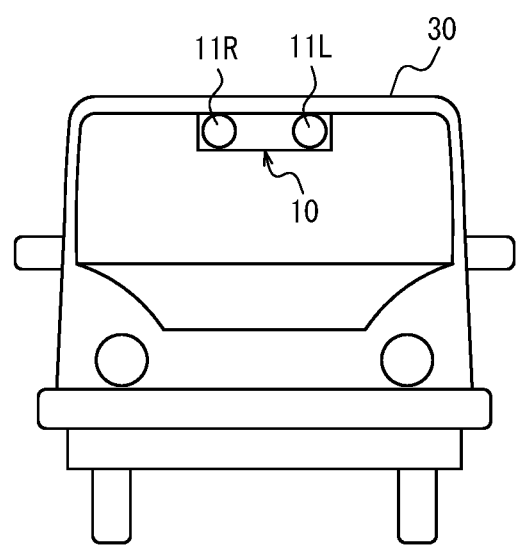
FIG. 3 is a front view schematically illustrating the vehicle having the stereo camera of FIG. 1 mounted therein.

As illustrated in FIG. 2 and FIG. 3, the stereo camera apparatus 10 may be arranged, for example, on a rear side of a rearview mirror inside a windshield of a vehicle 30 as viewed from the driver. As illustrated in the side view of FIG. 2, the first imaging unit 11R and the second imaging unit 11L may be arranged in the same position with respect to a vertical direction. When viewed in a traveling direction of the vehicle 30, the first imaging unit 11R may be positioned on the right side, and the second imaging unit 11L may be positioned on the left side. An optical axis $O_R$ of an optical system of the first imaging unit 11R and an optical axis $O_L$ of an optical system of the second imaging unit 11L are set to be parallel to a straight ahead direction of the vehicle 30 or to be directed slightly downward to be able to capture road markings and another vehicle traveling in front. According to the present embodiment, the first imaging unit 11R, the second imaging unit 11L, the controller 12, and the correction table switching unit 13 may be integrally configured and accommodated in the housing.

Next, each constituent element of the stereo camera apparatus 10 will be described with reference to FIG. 1. Constituent elements included in the first imaging unit 11R and constituent elements included in the second imaging unit 11L are denoted by reference signs ending with R or L for indicating their attribute of one of the imaging units. Constituent elements denoted by reference signs ending with R are included in the first imaging unit 11R. Constituent elements denoted by reference signs ending with L are included in the second imaging unit 11L.

Each of the first imaging unit 11R and the second imaging unit 11L is, for example, a CCD (Charge-Coupled Device) camera or a CMOS (Complementary MOS) camera having a zoom function. The first imaging unit 11R and the second imaging unit 11L may be monochrome cameras. As the first imaging unit 11R and the second imaging unit 11L have the same configurations, the configuration of the first imaging unit 11R will be described below.

The first imaging unit 11R includes an imaging optical system 14R (a first imaging optical system) having a variable focal length, an image sensor 15R (a first image sensor), and an actuator 16R (a first driving unit).

The imaging optical system 14R includes, in order from a subject side, a first lens group 17R, a second lens group 18R, and a third lens group 19R. Each of the lens groups includes at least one lens. The first lens group 17R may have a positive refractive power and may be fixed in the direction of the optical axis $O_R$. The second lens group 18R may be a variable zoom lens group (variator) movable in the direction of the optical axis $O_R$. The third lens group 19R may be a focusing movement correction lens group (a compensator) movable in the direction of the optical axis $O_R$.

The image sensor 15R includes a light receiving element including a CCD image sensor (Charge-Coupled Device Image Sensor) or a CMOS image sensor (Complementary MOS Image Sensor). The image sensor 15R converts incident light on a light receiving surface of the light receiving element into an electric signal, digitizes the electric signal by performing A/D conversion, and then outputs the resulting signal as a two-dimensional image signal to an image processing unit 22 of the controller 12, which will be described later.

The actuator 16R moves the second lens group 18R and the third lens group 19R of the imaging optical system 14R in conjunction with each other in the optical axis direction. The actuator 16R is a driving apparatus capable of accurate positioning. In one of a plurality of embodiments, the actuator 16R may be a stepping motor driven on a pulse signal sent from an external source. The actuator 16R is controlled on the basis of a pulse signal received from a focal length controller 21 of the controller 12, which will be described later. Note that the actuator 16R may be another driving apparatus such as a servomotor capable of accurate positioning.

The second imaging unit 11L is configured in a manner similar to the first imaging unit 11R. An imaging optical system 14L (a second imaging optical system) with a variable focal length, an image sensor 15L (a second image sensor), and an actuator 16L (a second driving unit) correspond to the imaging optical system 14R of the first imaging unit 11R, the image sensor 15R, and the actuator 16R, respectively. Also, in a manner similar to the imaging optical system 14R, the imaging optical system 14L may include a first lens group 17L, a second lens group 18L, and a third lens group 19L.

Next, the controller 12 will be described. The controller 12 is an apparatus configured to control the stereo camera apparatus 10 in its entirety and includes the focal length controller 21, the image processing unit 22, and a vehicle communication interface 23. The controller 12 includes one or more processors. The "processor" used herein may be a specialized processor dedicated to specific processing, or a general-purpose processor for reading a particular program and executing a particular function. The specialized processor may include a DSP (Digital Signal Processor) or an ASIC (Application Specific Integrated Circuit) for a specific usage. The processor may include a PLD (Programmable Logic Device). The PLD may include an FPGA (Field-Programmable Gate Array). The controller 12 may be either a SoC (System-on-a-Chip) in which one or more processors cooperate with one another, or a SiP (System In a Package).

The controller 12 executes functions of the focal length controller 21, the image processing unit 22, and the vehicle communication interface 23. Each of the functional blocks such as the focal length controller 21, the image processing unit 22, and the vehicle communication interface 23 may be a hardware module or a software module independent of one another. The controller 12 may execute operations performed by the functional blocks. The controller 12 is not limited to include all of the functional blocks, and may omit one or more of the functional blocks. One or more of the functional blocks may be provided independently of the controller 12. According to one of a plurality of embodiments, the controller 12 may execute all operations of the functional blocks. The operations performed by the functional blocks may be paraphrased as operations executed by the controller 12. An operation performed by the functional block under control of the controller 12 may be executed by the controller 12 on its own. The following is a detailed description of each constituent element.

The focal length controller 21 may include one or more processors. A function of the focal length controller 21 may be performed by one or more processors of the controller 12. The focal length controller 21 may be referred to as a controller for controlling a focal length of the stereo camera apparatus 10. The focal length controller 21 acquires travel state information from an in-vehicle ECU (Electronic Control Unit) 24 mounted in the vehicle 30 via the vehicle communication interface 23, and determines magnification on the basis of the travel state information.

The vehicle communication interface 23 is an input and output interface for intervening between the controller 12 and other in-vehicle systems via a physical communication interface of the stereo camera apparatus. The physical communication interface may include a physical connector or a wireless communication device. The physical connector may include an electrical connector corresponding to transmission of an electrical signal, an optical connector corresponding to transmission of an optical signal, or an electromagnetic connector corresponding to transmission of electromagnetic waves. The electrical connector includes a connector conforming to IEC 60603, a connector conforming to the USB standard, a connector corresponding to the RCA terminal, a connector corresponding to an S-terminal defined in EIAJCP-1211A, a connector corresponding to a D-terminal defined in EIAJRC-5237, a connector conforming to the HDMI standard, or a connector corresponding to a coaxial cable including BNC. The optical connector includes various connectors conforming to IEC 61754. The wireless communication device includes a wireless communication device conforming to various standards including Bluetooth and IEEE 802.11. The wireless communication device includes at least one antenna. The focal length controller 21 and the image processing unit 22 exchange information with the in-vehicle ECU 24 of the vehicle 30 via the vehicle communication interface 23 by using a CAN (Control Area Network) or the like.

The travel state information is information associated with a travel state of the vehicle 30. The travel state information includes, for example, driving information of the vehicle 30 such as a speed, a braking state, and a state of a transmission gear, and information about the road on which the vehicle 30 is traveling such as a type of the road currently traveling (a general road, a motorway, etc.), a terrain of the road, an inclination of the road, and so on.

The in-vehicle ECU 24 includes ECU of various types mounted in the vehicle 30. The in-vehicle ECU 24 includes ECU of various types including a power train system ECU such as an ECU for engine control, a safety system ECU for brake control and drive assistance based on sensor information, and an information system ECU such as a navigation ECU. The in-vehicle ECU includes a control apparatus for various information equipment mounted in the vehicle 30 before or after factory shipment. In FIG. 1, the in-vehicle ECU 24 collectively represents a plurality of ECU mentioned above.

The focal length controller 21 may acquire a vehicle speed signal from the in-vehicle ECU 24 such as, for example, the engine control ECU or a speedometer ECU via the vehicle communication interface 23, and determine the focal lengths of the first imaging unit 11R and the second imaging unit 11L on the basis of the travel speed. A change of the focal length means a change of a magnification and an angle of an image. According to the present embodiment, the focal length controller 21 determines a state of the imaging optical systems 14R and 14L between "wide angle" with a short focal length, a low magnification, and a wide angle, and "telephoto" with a long focal length, a high magnification, and a narrow angle.

Further, the focal length controller 21 outputs synchronized driving signals to the actuator 16R and the actuator 16L on the basis of the "wide angle" or the "telephoto". In this way, the focal length controller 21 shifts the second lens group 18R and the third lens group 19R of the imaging optical system 14R of the first imaging unit 11R and the second lens group 18L and the third lens group 19L of the imaging optical system 14L of the second imaging unit 11L in the optical axis direction between a wide angle position and a telephoto position. In particular, the focal length controller 21 outputs synchronized driving signals to the actuators 16R and 16L. When the actuators 16R and 16L are configured with stepping motors, the driving signals are the same pulse signals for driving the stepping motors. In this way, the actuators 16R and 16L operate in exactly equal manners, and the imaging optical systems 14R and 14L are caused to have the same focal lengths at all times.

Figure 4:
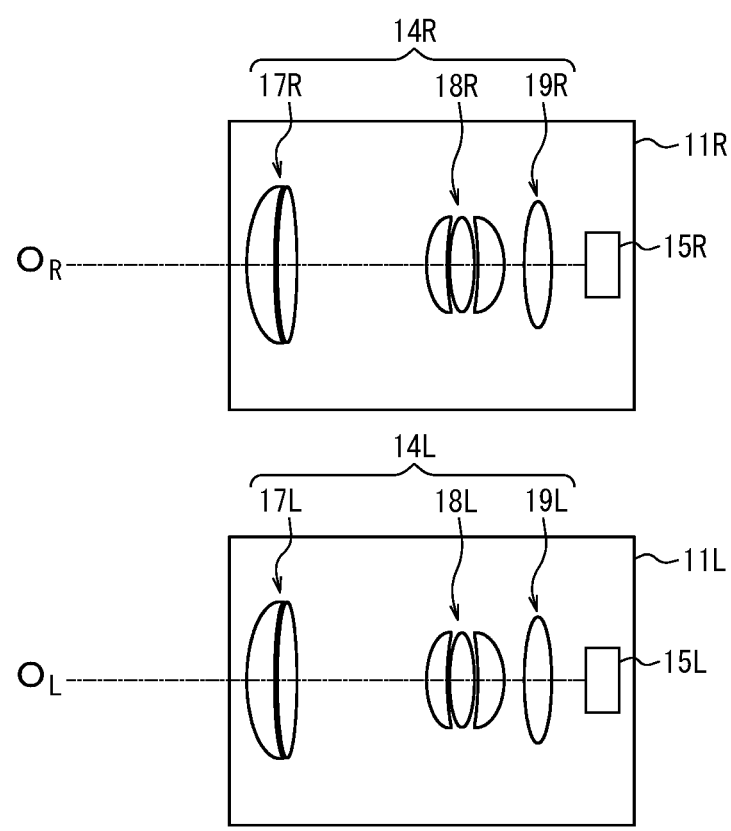
FIG. 4 is a diagram illustrating an optical system of the stereo camera apparatus of FIG. 1 in a telephoto position.

FIG. 1 illustrates the imaging optical system 14R and the imaging optical system 14L in which the first lens groups 17R and 17L, the second lens groups 18R and 18L, and the third lens group 19R and 19L are arranged for a wide angle. The arrangement of the lens groups in this manner is referred to as the wide angle position. On the other hand, FIG. 4 illustrates the first lens groups 17R and 17L, the second lens groups 18R and 18L, and the third lens groups 19R and 19L arranged for a telephoto. The arrangement of the lens groups in this manner is referred to as the telephoto position. The second lens groups 18R and 18L and the third lens groups 19R and 19L are moved to the wide angle position or the telephoto position along the optical axis $O_R$ and the optical axis $O_L$ between a subject side and an image side.

The first imaging unit 11R and the second imaging unit 11L each capture an image to be used for parallax calculation with respect to a subject located in a close range or in a long range. To that end, the first imaging unit 11R and the second imaging unit 11L are configured to have a deep depth of field and capture an image with little blur from a close range to infinity. Also, the third lens groups 19R and 19L are adjusted to focus on a predetermined point in a relatively long distance at all times. According to the present embodiment, thus, in the imaging optical systems 14R and 14L, positions of the second lens groups 18R and 18L and positions of the third lens groups 19R and 19L are uniquely associated to one another. For example, the second lens groups 18R and 18L and the third lens groups 19R and 19L are guided in the direction of the optical axis $O_R$ and in the direction of the optical axis $O_L$ by the same cam mechanism. Thus, when the second lens groups 18R and 18L are shifted by the actuators 16R and 16L in the direction of the optical axis $O_R$ and in the direction of the optical axis $O_L$ between the wide angle position and the telephoto position, the third lens groups 19R and 19L are also shifted in conjunction with the second lens groups 18R and 18L, respectively. In the first imaging unit 11R and the second imaging unit 11L, accordingly, the second lens group 18R and the third lens group 19R may be driven by the actuator 16R, and the second lens group 18L and the third lens group 19L may be driven by the actuator 16L.

When the focal length controller 21 changes between two zoom positions, i.e., the wide angle position and the telephoto position, the focal length controller 21 instructs the correction table switching unit 13, which will be described later, to switch to a correction table group corresponding to the zoom position currently set.

The image processing unit 22 calculates a parallax with respect to, and a distance to, the subject on the basis of the image signals output from the image sensor 15R of the first imaging unit 11R and the second image sensor 15L of the second imaging unit 11L. The image processing unit 22 may be a part of the processor constituting the controller 12. The image processing unit 22 may include a processor such as an ASIC (Application Specific Integrated Circuit) designed for stereo image processing or an FPGA (Field-Programmable Gate Array). The image processing unit 22 may further include a memory such as a DRAM (Dynamic Random Access Memory) and/or an SDRAM (Synchronous Dynamic Random Access Memory) for provisionally storing image data. The image processing unit 22 may be paraphrased as an image processor.

When receiving the image signals, the image processing unit 22 adjusts the images output from the first imaging unit 11R and the second imaging unit 11L. For example, the image processing unit 22 adjusts brightness and/or contrast of the images in accordance with a surrounding environment.

Further, the image processing unit 22 corrects the images output from the first imaging unit 11R and the second imaging unit 11L. For example, when there is a difference between the direction of the first imaging unit 11R and the direction of the second imaging unit 11L, the images are corrected in accordance with an amount of the difference. Also, the image processing unit 22 corrects an aberration caused by distortion of a lens. In general, the distortion increases as an angle of an optical system increases. Thus, different corrections are necessary in accordance with the focal lengths of the imaging optical systems 14R and 14L between the wide angle position and the telephoto position. These corrections are performed by acquiring, from the correction table switching unit 13, a correction table for aberration correction corresponding to a current zoom position. The image processing unit 22, by using the correction table for aberration correction, corrects the aberration of the images captured by the first imaging unit 11R and the second imaging unit 11L in accordance with the focal lengths of the imaging optical systems 14R and 14L. Further, the image processing unit 22 also corrects individual differences of the lenses included in the imaging optical systems 14R and 14L by using the correction table included in the correction table switching unit 13. The contents of each correction table are determined on the basis of design values or measurement performed in advance and stored in the correction table switching unit 13.

The image processing unit 22 sets one of the image output from the first imaging unit 11R and the image output from the second imaging unit 11L as a standard image, and sets the other image as a reference image. The image processing unit 22 divides the reference image into rectangular blocks such as 3×3 pixels or 5×5 pixels and calculates the parallax by finding the most similar block from the reference image. The method for calculating the parallax is well known, and thus a detailed description thereof will be omitted. The image processing unit 22 may include a dedicated distance calculation circuit for high-speed parallel processing of block matching.

Further, the image processing unit 22 may calculate a distance to the subject on the basis of a calculated parallax. The distance may be calculated by using a parallax table serving as a conversion table between an input parallax and a distance. The imaging optical system 14R and the imaging optical system 14L have different correlation between the parallax represented by a pixel value and a distance expressed in metric units in accordance with a zoom position. Thus, the image processing unit 22 includes a parallax table corresponding to a current zoom position. The image processing unit 22 may acquire the parallax table corresponding to the current zoom position from the correction table switching unit 13.

The image processing unit 22 outputs the information about the calculated distance to the object to the in-vehicle ECU 24 via the vehicle communication interface 23.

For example, the in-vehicle ECU 24 is the safety system ECU capable of controlling to prevent from coming within a close proximity to the vehicle traveling in front or to an obstacle by using distance information received, and also issuing a warning. When the travel speed of the vehicle 30 is relatively slow and, simultaneously, the imaging optical systems 14R and 14L are in the wide angle positions, sudden appearance of a person and/or a car from a roadside within a relatively close range may be detected. On the other hand, when the travel speed of the vehicle 30 is relatively fast and, simultaneously, the imaging optical systems 14R and 14L are in the telescopic positions, a distance to the vehicle in front in a relatively long distance may be more accurately detected. As described above, the distance may be measured in accordance with the travel speed of the vehicle 30.

The correction table switching unit 13, in accordance with the current zoom position input by the focal length controller 21, outputs a wide angle correction table group 25 corresponding to a wide angle or a telephoto correction table group 26 corresponding to a telephoto to the image processing unit 22. The wide angle correction table group 25 and the telephoto correction table group 26 each include a correction table used for correcting distortions of the images caused by the imaging optical system 14R and the imaging optical system 14L. The correction table includes an aberration correction table. Further, the wide angle correction table group 25 and telephoto correction table group 26 may include parallax tables for converting parallax information into the distance information.

The correction table switching unit 13 may include a microprocessor and a memory for storing the correction table groups. The correction table switching unit 13 may be implemented by a CPU and a memory the same as those of the controller 12, or by hardware different from that of the controller 12. The correction table switching unit 13 may be implemented by a memory readable by the image processing unit 22.

Figure 5:
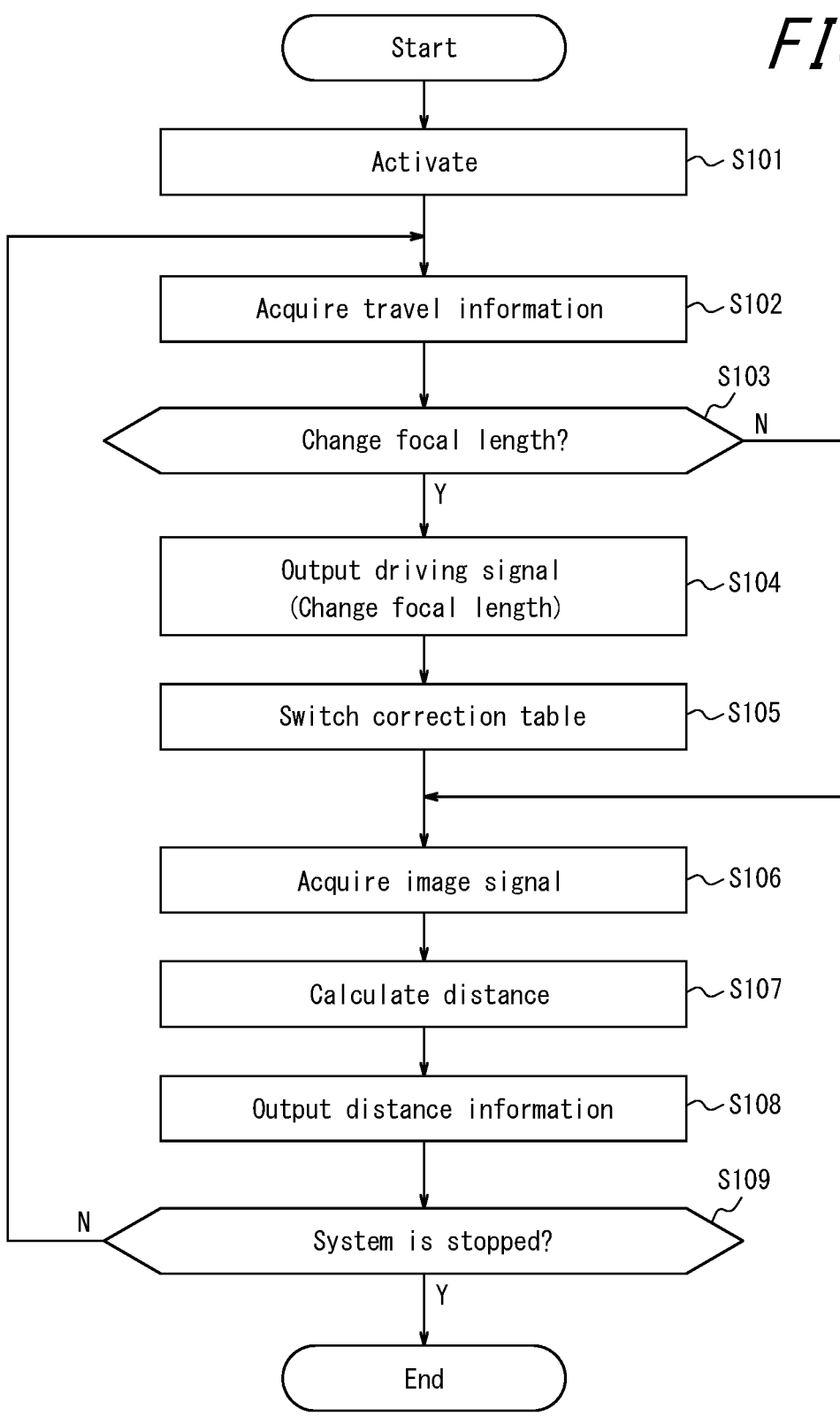
FIG. 5 is a flowchart of measurement of a distance by a controller of FIG. 1.

Next, operation of the stereo camera apparatus 10 will be described with reference to a flowchart of FIG. 5 illustrating processing performed by the controller 12.

First, the stereo camera apparatus 10 is activated when the driver operates an ignition key of the vehicle 30 or turns on a power of the stereo camera apparatus 10 (step S101).

Next, the focal length controller 21 of the controller 12 acquires the travel information of the vehicle 30 from the in-vehicle ECU 24 (step S102). The travel information of the vehicle 30 is, for example, information about the travel speed acquired from the vehicle speed sensor of the vehicle 30.

When the focal length controller 21 acquires the travel information, the focal length controller 21 determines whether to change the focal length by driving the actuator 16R of the first imaging unit 11R and the actuator 16L of the second imaging unit 11L on the basis of the drive information (step S103). For example, in a case where the travel information is the information about the travel speed, when the travel speed is slower than a predetermined threshold, the focal length controller 21 sets a relatively short focal length for capturing an image with a low magnification in a wide angle. On the other hand, when the travel speed is faster than the predetermined threshold, the focal length controller 21 sets a long focal length for capturing an image with a high magnification in a narrow angle. When the travel speed is 0 at the activation of the stereo camera apparatus 10, the zoom position may be in the wide angle position.

When the focal length controller 21 determines to change the focal length in step S103, the focal length controller 21 proceeds to step S104. When the focal length controller 21 determines to not change the focal length, the focal length controller 21 proceeds to step S106.

In step S104, the focal length controller 21 outputs the driving signal to the actuator 16R of the first imaging unit 11R and the actuator 16L of the second imaging unit 11L. The actuators 16R and 16L are, for example, stepping motors. The focal length controller 21 may output pulse signals to drive the stepping motors.

Next, the focal length controller 21 instructs the correction table switching unit 13 to switch the correction table group (step S105). For example, when the zoom position is changed from the wide angle position to the telephoto position, the telephoto correction table group 26 is set as a current correction table group. On the other hand, when the zoom position is changed from the telephoto position to the wide angle position, the wide angle correction table group 25 is set as the current correction table. After changing the correction table group, the processing proceeds to step S106.

In step S106, the image processing unit 22 acquires the image signals of the images captured by the first imaging unit 11R and the second imaging unit 11L from the image sensor 15R of the first imaging unit 11R and the image sensor 15L of the second imaging unit 11L. Subsequently, the image processing unit 22 adjusts the distortion of the images acquired from the first imaging unit 11R and the second imaging unit 11L. The adjustment of the distortion is performed by acquiring the correction table from the current correction table group of the correction table switching unit 13.

Further, the image processing unit 22 generates a parallax image by mapping the parallax in two dimensions by using the parallax of the two images acquired from the first imaging unit 11R and the second imaging unit 11L. The parallax image may be generated within the image processing unit 22 and does not need to be actually displayed on a display apparatus or the like. Further, the image processing unit 22 calculates the distance information of each position in the captured images from a parallax of each position in the parallax image by using the parallax table acquired from the current correction table group of the correction table switching unit 13 (step S107).

The image processing unit 22 outputs the calculated distance information to the in-vehicle ECU 24 (step S108). For example, the image processing unit 22 outputs the distance information to the in-vehicle ECU 24 implemented by the safety system ECU and, when the distance to the vehicle traveling in front becomes too short, the in-vehicle ECU 24 may issue a warning to the driver or cause the vehicle 30 to reduce speed.

The controller 12 stops the processing when detecting that the driver turns off the ignition key of the vehicle 30 or turns off the power of the stereo camera apparatus 10. Otherwise, the controller 12 repeats the steps S102 to S108 (step S109).

According to the present embodiment, as described above, the stereo camera apparatus 10 uses the focal length controller 21 for both the actuator 16R of the first imaging unit 11R and the actuator 16L of the two imaging unit 11L. The focal length controller 21 outputs the synchronized driving signals to the actuators 16R and 16L, and thus is capable of accurately synchronizing the control of the focal lengths of the first imaging unit 11R and the second imaging unit 11L. Thus, the stereo camera apparatus 10 may achieve both having the zoom function and acquiring the parallax data for enabling highly accurate distance measurement.

Also, the stereo camera apparatus 10 includes the correction table switching unit 13 and corrects the aberration of the images in each of the wide angle position and the telephoto position in accordance with changes in the focal lengths of the imaging optical systems 14R and 14L. Thus, recognition accuracy may be further improved. Further, the individual differences of the lenses of the imaging optical systems 14R and 14L may also be corrected by the correction table switching unit 13.

Also, the stereo camera apparatus 10 acquires the travel state information from the in-vehicle ECU 24 and thus is capable of automatically selecting the zoom position corresponding to the travel state.

Further, the imaging optical systems 14R and 14L of the stereo camera apparatus 10 each include three lens groups, in which the second lens groups 18R and 18L for zooming and the third lens groups 19R and 19L for the focal movement correction are interlocked with each other such that their positions uniquely correspond to each other. Thus, the actuators 16R and 16L may drive the corresponding lens groups. This enables simple configurations of the first imaging unit 11R and the second imaging unit 11L and enhances accuracy of the distance measurement.

Also, the stereo camera apparatus 10 uses an optical zoom for actually changing the focal length, instead of using a digital zoom for magnifying a captured image. Thus, the accuracy of the information is not deteriorated due to the magnification and interpolation processing of an image, and accurate information necessary for the distance measurement may be acquired.

According to the above embodiment, the focal lengths of the first imaging unit 11R and the second imaging unit 11L are changed on the basis of the travel speed. However, a condition to change the focal lengths is not limited to the travel speed. For example, the focal length controller 21 acquires information about a map encompassing the vehicle 30 as the travel information from the in-vehicle ECU 24 and determines a type of the road currently driving. The focal length controller 21 may set the telephoto position as the zoom position when driving a freeway. The focal length controller 21 may set the wide angle position as the zoom position when driving in town. Further, the focal length controller 21 may acquire operation information of a turn signal (a blinker) as the travel information from the in-vehicle ECU 24. The focal length controller 21 may set the wide angle position when the turn signal is turned on. Further, the focal length controller 21 may acquire acceleration of the vehicle 30 as the travel information from the in-vehicle ECU 24. The focal length controller 21 may set the telephoto position as the zoom position during acceleration. The focal length controller 21 may set the wide angle position as the zoom position during deceleration.

Second Embodiment

A stereo camera apparatus 10 according to a second embodiment, as one of a plurality of embodiments of the present disclosure, includes constituent elements similar to those of the stereo camera apparatus 10 according to the first embodiment. However, some control performed by the controller 12 is different.

Figure 6:
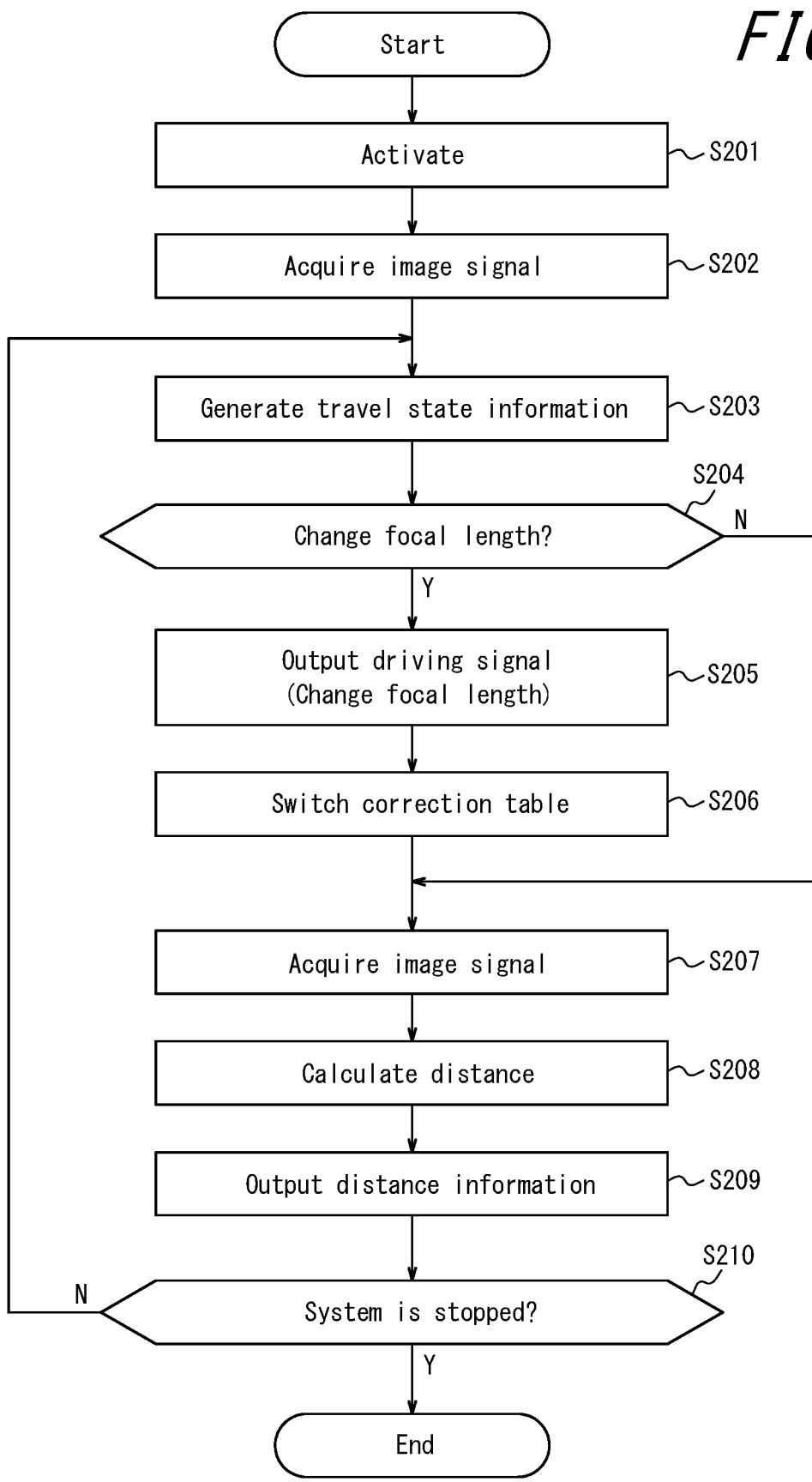
FIG. 6 is a flowchart of measurement of a distance by a stereo camera apparatus according to a second embodiment.

As illustrated in FIG. 6, unlike the first embodiment, the present embodiment acquires the image signals (step S202), generates the travel state information (step S203), and then determines whether to change the focal length (step S204). Procedures in other steps (step S201 and S205 to S210) are the same as the procedures (in step S101 and steps S104 to S109) of the first embodiment. Thus, features different from the first embodiment will be described below.

According to the present embodiment, the focal length controller 21 acquires the travel state information generated by the image processing unit 22 instead of, or in addition to, the travel state information from the in-vehicle ECU 24. The image processing unit 22 generates the travel state information on the basis of one or both of the image acquired from the first imaging unit 11R and the image acquired from the second imaging unit 11L. To that end, after the activation of the stereo camera apparatus 10 (step S201), the image processing unit 22 first acquires the image signals from the first imaging unit 11R and the second imaging unit 11L.

Figure 7A:
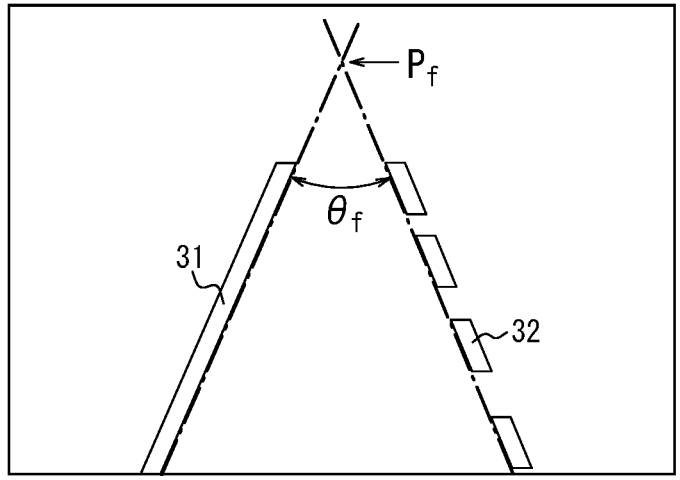
FIGS. 7A to 7C are diagrams illustrating a zoom change based on image processing.
Figure 7B:
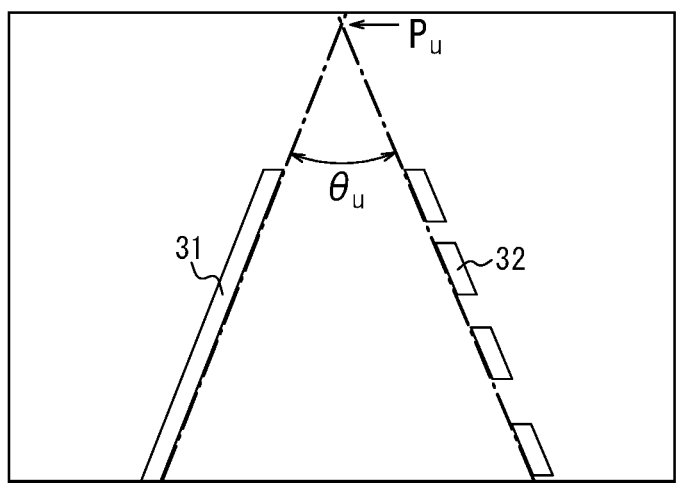
Figure 7C:
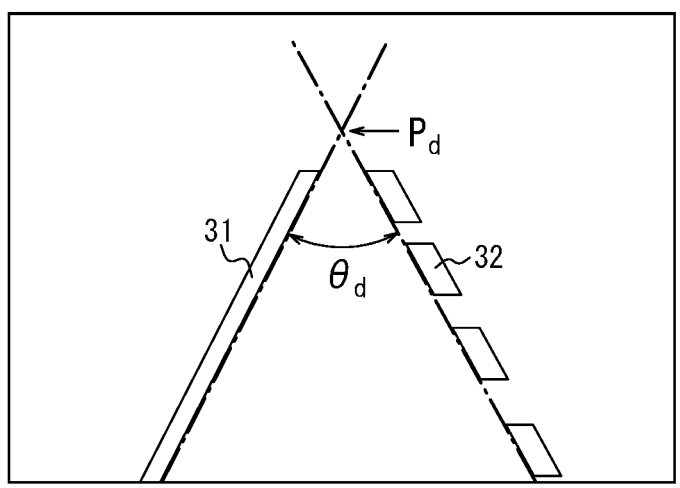

Next, the image processing unit 22 generates the travel state information on the basis of acquired image signals (step S203). An example of the generation of the travel state information will be described with reference to FIGS. 7A to 7C. FIGS. 7A to 7C each illustrate an image captured by the first imaging unit 11R or the second imaging unit 11L including a road edge line 31 and a road center line 32 serving as lane markings When the road extends linearly forward, the road edge line 31 and the road center line 32 are parallel to each other in the real space. In the captured image, extension lines of the road edge line 31 and the road center line 32 intersect with each other at a vanishing point corresponding to infinity.

FIG. 7A illustrates a vanishing point $P_f$ and an angle $\theta_f$ between the road edge line 31 and the road center line 32 when the road is horizontal. FIG. 7B illustrates a vanishing point $P_u$ and an angle $\theta_u$ between the road edge line 31 and the road center line 32 when the road changes from horizontal to uphill. FIG. 7C illustrates a vanishing point $P_d$ and an angle $\theta_d$ between the road edge line 31 and the road center line 32 when the road changes from horizontal to downhill In this case, heights ($p_f$, $p_u$, and $p_d$) of the vanishing points $P_f$, $P_u$, and $P_d$ in the vertical direction and the angles $\theta_f$, $\theta_u$, and $\theta_d$ between the road edge line 31 and the road center line 32 satisfy the following relations:

$$p_d < p_f < p_u$$

$$\theta_u < \theta_f < \theta_d$$

Thus, the image processing unit 22 performs recognition processing of the lane markings including the road edge line 31 and the road center line 32, generates a vertical height p of the vanishing point or the angle θ between the road edge line 31 and the road center line 32 as the travel state information, and then provides the travel state information to the focal length controller 21. The focal length controller 21 determines whether to change the focal length on the basis of the vertical height p of the vanishing point or the angle θ between the road edge line 31 and the road center line 32 acquired from the image processing unit 22.

For example, when the travel state information indicates an inclination of the road in front of the vehicle 30, this information is represented by the vertical height p of the vanishing point. When the vertical height p of the vanishing point is greater than a predetermined threshold, it means that an uphill is coming and the vehicle 30 is expected to slow down. Thus, when the zoom position is in the telephoto position, the focal length controller 21 changes the zoom position to the wide angle position. When the vertical height p of the vanishing point is smaller than the predetermined threshold, it means that a downhill is coming and the vehicle 30 is expected to speed up. Thus, when the zoom position is in the telephoto position, the focal length controller 21 changes the zoom position to the wide angle position.

The subsequent steps (step S205 to step S210) are the same as the steps (step S204 to step S209) of FIG. 5 according to the first embodiment. Also, the controller 12 repeats the steps S203 to S210 unless the system is stopped in step S210. Note that, in step S203 in the second and subsequent times, the image processing unit 22 generates the travel state information on the basis of the image signals acquired in step S207.

As described above, the focal length may be controlled on the basis of the image captured by the stereo camera apparatus 10. In this case also, the focal length controller 21 sends the synchronized driving signals to the first imaging unit 11R and the second imaging unit 11L. Thus, in a manner similar to the first embodiment, the parallax data for enabling highly accurate distance measurement may be obtained while the zoom function is implemented. Further, there also is an effect that the determination whether to change the zoom position may be made by simply using the images acquired from the first imaging unit 11R and the second imaging unit 11L.

The method for changing the focal length on the basis of the image processing is not limited to the above examples. For example, when the image processing unit 22 detects, during the image processing, that the road edge line 31 or the road center line 32 is bent, the image processing unit 22 determines that the road on which the vehicle 30 is traveling is curved ahead. In this case, the image processing unit 22 provides the focal length controller 21 with information that the road is curved as the travel state information. Upon reception of this information, the focal length controller 21 may control to change the zoom position of the first imaging unit 11R and the second imaging unit 11L from the telephoto position to the wide angle position.

Further, the image processing unit 22 may calculate a distance by using the parallax information and detect a vehicle traveling in front, by performing object recognition processing on the images captured by the first imaging unit 11R and the second imaging unit 11L. The image processing unit 22 may provide the focal length controller 21 with the distance to the vehicle traveling in front as the travel state information. For example, when the vehicle traveling in front is located further than a predetermined distance and, also, the zoom position is in the wide angle position, the focal length controller 21 changes the zoom position to the telephoto position. On the other hand, when the vehicle traveling in front is located closer than the predetermined distance and, simultaneously, the zoom position is in the telephoto position, the focal length controller 21 changes the zoom position to the wide angle position. Thus, when the vehicle traveling in front is located in a long distance, a magnified image is captured. This increases parallax between the first imaging unit 11R and the second imaging unit 11L expressed in pixel units. Generally, a long distance measurement by a stereo camera apparatus is less accurate due to a long distance to correspond to divergence of one pixel. However, the method according to the present embodiment enables more accurate distance measurement even when a vehicle traveling in front is located in a long distance.

The present disclosure is not limited to the first and second embodiments described above, and may be modified or varied in a variety of manners. For example, the above embodiments illustrate the examples in which the stereo camera apparatus 10 includes the first imaging unit 11R, the second imaging unit 11L, the controller 12, and the correction table switching unit 13 which are integrally configured. However, the stereo camera apparatus 10 may include the first imaging unit 11R and the second imaging unit 11L integrally configured and the controller 12 and the correction table switching unit 13 integrally configured.

Also, arranging positions of the first imaging unit 11R and the second imaging unit 11L of the stereo camera apparatus 10 are not limited to the inside of the windshield and may be in various positions. For example, the first imaging unit 11R and the second imaging unit 11L may each be fixed to a front surface of a front bumper of the vehicle 30. Also, although the first imaging unit 11R and the second imaging unit 11L are monochrome cameras in the above embodiments, color cameras or cameras capable of capturing light in an infrared region may be used. Further, the imaging optical systems 14R and 14L are not limited to include three lens groups and may include two lens groups, or four or more lens groups.

Also, although in the above embodiments the first imaging unit 11R and the second imaging unit 11L are changed between two different focal lengths, i.e., the wide angle and the telephoto, this is not restrictive. The first imaging unit 11R and the second imaging unit 11L may be changed in three or more steps of the focal length. In this case, the correction table switching unit 13 includes correction table groups corresponding to the steps.

Although a plurality of methods for the determination to change the focal length are described in the above embodiments by way of example, other various methods may be employed for the determination. Also, the methods for the determination described in each of the embodiments may be used in combination.

Further, although in the above embodiments the stereo camera apparatus 10 includes the first imaging unit 11R and the second imaging unit 11L, the stereo camera apparatus may include three or more imaging units.

REFERENCE SIGNS LIST

10 stereo camera apparatus
11R first imaging unit
11L second imaging unit
12 controller
13 correction table switching unit
14R, 14L imaging optical system
15R, 15L image sensor
16R, 16L actuator
17R, 17L first lens group
18R, 18L second lens group
19R, 19L third lens group
21 focal length controller
22 image processing unit
23 vehicle communication interface
24 in-vehicle ECU
25 wide angle correction table group
26 telephoto correction table group
30 vehicle
31 road edge line
32 road center line

The invention claimed is:

1. A stereo camera apparatus comprising:
  a first imaging unit including a first imaging optical system provided with a plurality of lens groups, and a first driving unit configured to change a focal length by driving at least one of the plurality of lens groups of the first imaging optical system;
  a second imaging unit including a second imaging optical system provided with a plurality of lens groups, and a second driving unit configured to change a focal length by driving at least one of the plurality of lens groups of the second imaging optical system;

a focal length controller configured to output synchronized driving signals to the first driving unit and the second driving unit; and an image processing unit configured to calculate a parallax with respect to a subject by using an image captured by the first imaging unit and an image captured by the second imaging unit, and configured to switch a correction table used for aberration correction in synchronization with a change in the focal length in accordance with the focal length of the first imaging optical system and the focal length of the second imaging optical system, such that in calculating the parallax, the image captured by the first imaging unit and the image captured by the second imaging unit are corrected by using the correction table, and then parallax with respect to the subject is calculated by using corrected images, wherein when mounted in a vehicle, the focal length controller acquires travel state information about a travel state of the vehicle and outputs driving signals to the first driving unit and the second driving unit in accordance with the travel state information, the image processing unit generates the travel state information on the basis of one or both of the image captured by the first imaging unit and the image captured by the second imaging unit, the focal length controller acquires the travel state information from the image processing unit, the travel state information includes one or more of speed, information about a road on which the vehicle is traveling, inclination of the road, and curvature of the road, and the focal length controller is configured to control the first driving unit and the second driving unit to achieve different types of focusing, including telephoto and zoom, based on different conditions of the travel state information.

2. The stereo camera apparatus according to claim 1, wherein the image processing unit corrects aberration of the image captured by the first imaging unit and the image captured by the second imaging unit in accordance with the focal length of the first imaging optical system and the focal length of the second imaging optical system.

3. The stereo camera apparatus according to claim 1, wherein each of the first driving unit and the second driving unit includes a stepping motor, and the focal length controller outputs a pulse signal for driving the stepping motor as a driving signal.

4. The stereo camera apparatus according to claim 1, wherein each of the first imaging optical system and the second imaging optical system includes two or more lens groups including a variable power lens group and a focusing movement correcting lens group, and the variable power lens group and the focusing movement correcting lens group are interlocked with each other to be positioned in a manner uniquely corresponding to each other.

5. A vehicle comprising a stereo camera apparatus including: a first imaging unit including a first imaging optical system provided with a plurality of lens groups, and a first driving unit configured to change a focal length by driving at least one of the plurality of lens groups of the first imaging optical system; a second imaging unit including a second imaging optical system provided with a plurality of lens groups, and a second driving unit configured to change a focal length by driving at least one of the plurality of lens groups of the second imaging optical system; a focal length controller configured to output synchronized driving signals to the first driving unit and the second driving unit; and an image processing unit configured to calculate a parallax with respect to a subject by using an image captured by the first imaging unit and an image captured by the second imaging unit, and configured to switch a correction table used for aberration correction in synchronization with a change in the focal length in accordance with the focal length of the first imaging optical system and the focal length of the second imaging optical system, such that in calculating the parallax, the image captured by the first imaging unit and the image captured by the second imaging unit are corrected by using the correction table, and then parallax with respect to the subject is calculated by using corrected images, wherein the focal length controller acquires travel state information about a travel state of the vehicle and outputs driving signals to the first driving unit and the second driving unit in accordance with the travel state information, the image processing unit generates the travel state information on the basis of one or both of the image captured by the first imaging unit and the image captured by the second imaging unit, the focal length controller acquires the travel state information from the image processing unit, the travel state information includes one or more of speed, information about a road on which the vehicle is traveling, inclination of the road, and curvature of the road, and the focal length controller is configured to control the first driving unit and the second driving unit to achieve different types of focusing, including telephoto and zoom, based on different conditions of the travel state information.

6. A parallax calculation method using a stereo camera apparatus including: a first imaging unit including a first imaging optical system provided with a plurality of lens groups, and a first driving unit configured to change a focal length by driving at least one of the plurality of lens groups of the first imaging optical system; and a second imaging unit including a second imaging optical system provided with a plurality of lens groups, and a second driving unit configured to change a focal length by driving at least one of the plurality of lens groups of the second imaging optical system, the parallax calculation method comprising:

outputting synchronized driving signals to the first driving unit and the second driving unit and changing the focal length of the first imaging optical system and the focal length of the second imaging optical system;

calculating a parallax with respect to a subject by using an image captured by the first imaging unit and an image captured by the second imaging unit;

switching a correction table used for aberration correction in synchronization with a change in the focal length in accordance with the focal length of the first imaging optical system and the focal length of the second imaging optical system, such that in the step of calculating the parallax, the image captured by the first imaging unit and the image captured by the second imaging unit are corrected by using the correction table, and then parallax with respect to the subject is calculated by using corrected images; and when the stereo camera apparatus is mounted in a vehicle, acquiring travel state information associated with a travel state of the vehicle is added before the step of changing the focal length, wherein the step of changing the focal length includes outputting a driving signal in accordance with the travel state information, in the step of acquiring the travel state information, the travel state information is acquired by generating the travel state information on the basis of one or both of the image captured by the first imaging unit and the image captured by the second imaging unit, the travel state information includes one or more of speed, information about a road on which the vehicle is traveling, inclination of the road, and curvature of the road, and the changing of the focal length includes controlling the first driving unit and the second driving unit to achieve different types of focusing, including telephoto and zoom, based on different conditions of the travel state information.

7. The stereo camera apparatus according to claim 1, wherein the first imaging unit and the second imaging unit each includes a fixed lens group, a variable power lens group, and a focusing movement correcting lens group, and the variable power lens group and the focusing movement correcting lens group are interlocked with each other to be positioned in a manner uniquely corresponding to each other.

8. The vehicle comprising a stereo camera apparatus according to claim 5, wherein the first imaging unit and the second imaging unit each includes a fixed lens group, a variable power lens group, and a focusing movement correcting lens group, and the variable power lens group and the focusing movement correcting lens group are interlocked with each other to be positioned in a manner uniquely corresponding to each other.

9. The parallax calculation method according to claim 6, wherein the first imaging unit and the second imaging unit each includes a fixed lens group, a variable power lens group, and a focusing movement correcting lens group, and the variable power lens group and the focusing movement correcting lens group are interlocked with each other to be positioned in a manner uniquely corresponding to each other.

* * * * *